United States Patent
Carzola

(10) Patent No.: US 10,118,632 B2
(45) Date of Patent: Nov. 6, 2018

(54) MULTIPURPOSE MOBILE UTILITY LIFTING ERGONOMIC CART

(71) Applicant: Alexander Louis Carzola, North Palm Beach, FL (US)

(72) Inventor: Alexander Louis Carzola, North Palm Beach, FL (US)

(*) Notice: Subject to any disclaimer, the term of this patent is extended or adjusted under 35 U.S.C. 154(b) by 0 days.

(21) Appl. No.: 15/601,760

(22) Filed: May 22, 2017

(65) Prior Publication Data
US 2017/0341666 A1 Nov. 30, 2017

Related U.S. Application Data

(60) Provisional application No. 62/342,648, filed on May 27, 2016.

(51) Int. Cl.
| | |
|---|---|
| B62B 3/02 | (2006.01) |
| B62B 5/06 | (2006.01) |
| B60L 1/00 | (2006.01) |
| B62B 5/04 | (2006.01) |
| B62B 3/00 | (2006.01) |

(52) U.S. Cl.
CPC ............... B62B 3/02 (2013.01); B60L 1/006 (2013.01); B62B 3/001 (2013.01); B62B 3/002 (2013.01); B62B 3/008 (2013.01); B62B 5/04 (2013.01); B62B 5/06 (2013.01); *B62B 2206/06* (2013.01); *B62B 2301/04* (2013.01)

(58) Field of Classification Search
CPC .. B62B 3/02; B62B 3/005; B62B 5/06; B62B 5/04; B62B 5/0013; B62B 2207/00; B62B 2202/12; B62B 2206/06
See application file for complete search history.

(56) References Cited

U.S. PATENT DOCUMENTS

| | | | | |
|---|---|---|---|---|
| 4,924,782 A | * | 5/1990 | Nichoalds | A47B 31/001 108/27 |
| 4,954,384 A | * | 9/1990 | Hartwell | A47B 71/00 150/154 |
| 5,002,293 A | * | 3/1991 | Gottselig | B62B 3/02 108/145 |
| 5,425,546 A | * | 6/1995 | Gerber | B62B 3/1428 108/44 |
| 5,887,878 A | * | 3/1999 | Tisbo | B62B 1/20 280/47.19 |
| 6,024,427 A | * | 2/2000 | Underwood | A47B 21/00 280/47.35 |

(Continued)

FOREIGN PATENT DOCUMENTS

WO WO-2014092331 A1 * 6/2014 ............... B66F 3/22

*Primary Examiner* — James A Shriver, II
*Assistant Examiner* — Steve Clemmons

(57) ABSTRACT

A multipurpose mobile utility lifting ergonomic cart consists of a structural frame, a platform, at least one insert, a plurality of wheels, and a height-adjustable arm. The height-adjustable arm extends from the structural frame and is connected to the platform so that the platform can be positioned at varying heights. The platform provides workspace for the user by being attached to the at least one insert that can be, but is not limited to, a dish drying rack, a podium insert, or a house cleaner rack. The structural frame can be used for holding items such as boxes or cleaning supplies. The plurality of wheels allows the user to move the apparatus from one location to another.

15 Claims, 15 Drawing Sheets

(56) References Cited

U.S. PATENT DOCUMENTS

| | | | | |
|---|---|---|---|---|
| 6,547,264 B1* | 4/2003 | Blackburn | B62B 5/00 108/144.11 |
| 6,854,747 B2* | 2/2005 | Erickson | B62B 5/0013 150/154 |
| 6,944,981 B1* | 9/2005 | Garberg | A47F 5/137 186/27 |
| 6,986,431 B2* | 1/2006 | Koester | B62B 3/006 211/184 |
| 7,213,816 B2* | 5/2007 | Gregory | B62B 3/106 280/33.996 |
| 7,249,771 B1* | 7/2007 | Brennan | A47J 37/0704 280/35 |
| 7,823,893 B2* | 11/2010 | Meyers | B62B 1/12 280/47.18 |
| 8,424,883 B1* | 4/2013 | Ramos | B62B 3/02 108/145 |
| 8,864,149 B2* | 10/2014 | Stryker | A61G 12/001 280/47.35 |
| 9,039,016 B2* | 5/2015 | Abernethy | B62B 3/02 280/6.15 |
| 9,079,600 B2* | 7/2015 | Houlihan | B62B 3/008 |
| 9,463,129 B2* | 10/2016 | Hallman | A61G 13/0027 |
| 9,623,887 B1* | 4/2017 | Brassard | B62B 3/004 |
| 2002/0162935 A1* | 11/2002 | Hardy | A47B 23/044 248/460 |
| 2004/0150151 A1* | 8/2004 | Diermeier | A47J 47/005 269/289 R |
| 2005/0236940 A1* | 10/2005 | Rockoff | A61G 12/001 312/209 |
| 2005/0275178 A1* | 12/2005 | Huesdash | A47B 57/482 280/47.35 |
| 2007/0018433 A1* | 1/2007 | Sinnamon | A61G 12/001 280/651 |
| 2007/0034125 A1* | 2/2007 | Lo | B66F 7/0608 108/145 |
| 2010/0303603 A1* | 12/2010 | Galante | A47B 97/00 414/811 |
| 2012/0318939 A1* | 12/2012 | Galgano | B65D 85/04 248/127 |
| 2013/0026120 A1* | 1/2013 | Johnson | A47B 55/02 211/85.5 |
| 2014/0138925 A1* | 5/2014 | Ono | B62B 3/02 280/35 |
| 2014/0238799 A1* | 8/2014 | Sharma | B62B 1/125 190/11 |
| 2017/0327139 A1* | 11/2017 | Thibault | B62B 3/02 |

* cited by examiner

MULTIPURPOSE MOBILE UTILITY LIFTING ERGONOMIC CART

The current application claims a priority to the U.S. Provisional Patent application Ser. No. 62/342,648 filed on May 27, 2016.

FIELD OF THE INVENTION

The present invention relates generally to a multipurpose utility cart. More specifically, the present invention introduces a multipurpose utility cart with a height-adjustable platform. The effective design allows the present invention to be used in a wide variety of fields.

BACKGROUND OF THE INVENTION

Elevated surfaces, desks, tables, and the like, are under-utilized in many industries. In grocery retail stores in particular, a worker often must stock shelves with heavy items; however, it is not uncommon to see that worker struggle to lift heavy cases of consumer goods well over his/her head, in a dangerous and potentially harmful manner. Such lifting causes concern for the worker, who might get injured in the process, the managers, who need shelves to be stocked quickly and efficiently, and the customers, who do not feel safe walking past a worker who is struggling to hold a large amount of weight. The worker is also too preoccupied to help a customer, which causes frustration for the managers and inconvenience for the customer. What is needed is a mobile surface or platform that can support a large amount of weight, an arm that can lower for addition of goods and raise for upper shelf stocking as needed, and a ladder to help the worker reach those high shelves. What would be even more beneficial is if this rising surface or platform could support cleaning supplies, writing implements for tracking goods, a garbage chute and bag support so small pieces of garbage can be disposed of quickly and simply, and caution cones for situations that require isolation of an area. Such an arrangement would allow a worker to take with him/her one convenient cart with everything needed to fix any retail store scenario.

The multipurpose mobile utility lifting ergonomic cart, introduced by the present invention, makes it easy for a worker to keep his/her important items with them as needed. Such items may include a ladder, an accessible garbage bag, a duster, a bottle of spray cleaner, an extendible broom, a dustpan, a rag, tape, paper clips, pencils, pens, a safety knee cushion for stocking items at floor level, a large caution sign, and more. The present invention also includes several platform attachments for different functions. For example, one such platform attachment is a clipboard hinge attachment for holding papers while a user writes; another such platform attachment is an angled podium for delivering speeches. There are many potential variations of useful platforms with unique designs that can be applied to the present invention. Several of these variations would also benefit from the application of a disposable cover, to protect the present invention from damage during use. Such a cover is also provided. The present invention allows these platforms to rise up to a more comfortable working level. The magnets on the sides of the present invention are perfect for attachment to a stocking cart or a sorting cart, which are commonly used in retail and hold more items for stocking.

DETAIL DESCRIPTIONS OF THE INVENTION

Figure 1:
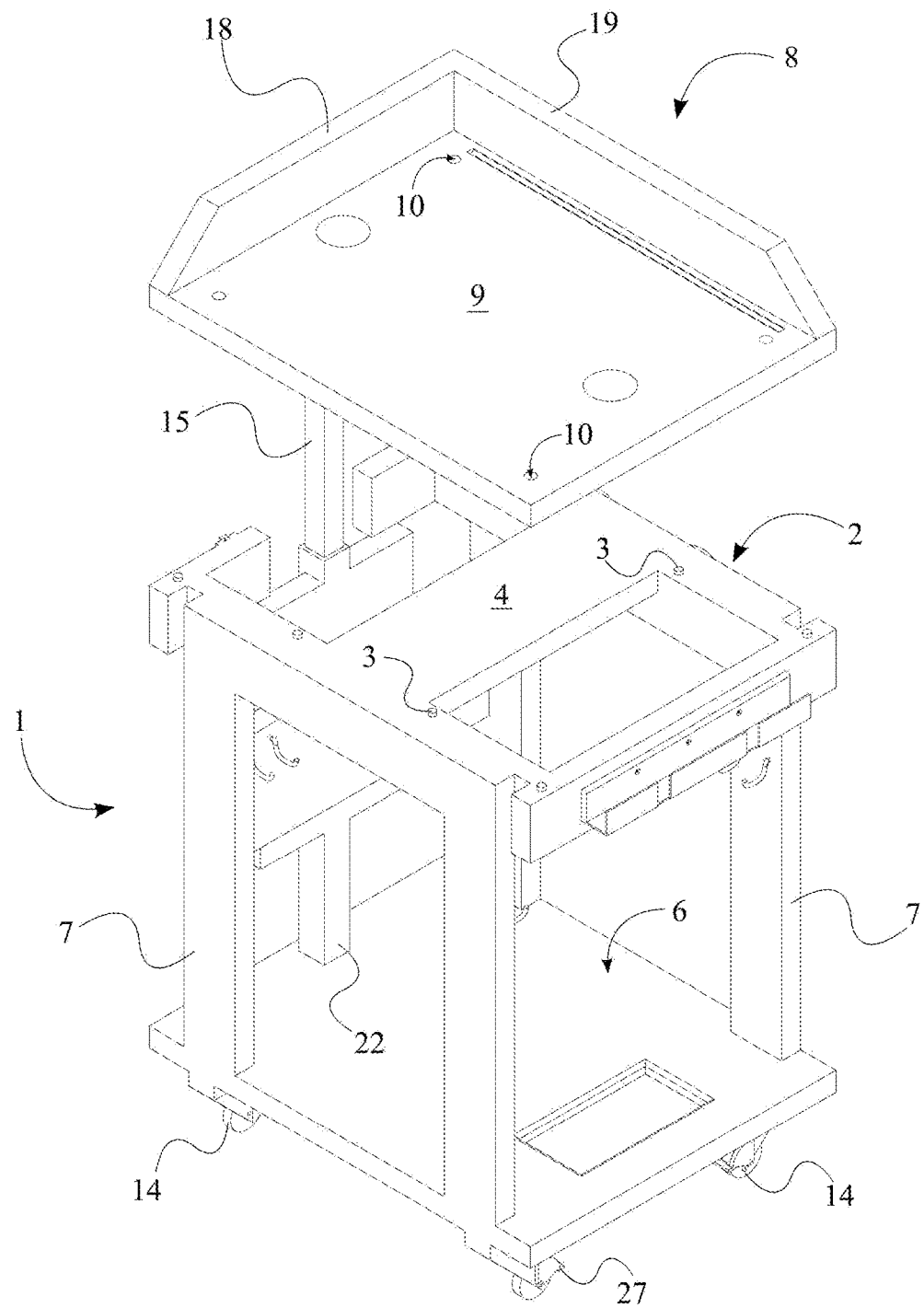
FIG. 1 is a perspective view of the present invention, wherein the platform is in an expanded configuration.

All illustrations of the drawings are for the purpose of describing selected versions of the present invention and are not intended to limit the scope of the present invention.

The present invention introduces a multipurpose utility cart. The mobility and the height adjustability allows the user to utilize the present invention in a variety of fields. As an example, the height adjustability is beneficial in the process of stocking shelves. On the other hand, the mobility is beneficial to a user utilizing the present invention for holding cleaning supplies. By utilizing the present invention, job related injuries can be prevented and the decrease in job satisfaction can be effectively addressed.

As illustrated in FIGS. 1-4, the present invention comprises a structural frame 1, a platform 8, at least one insert 11, a plurality of wheels 14, and a height-adjustable arm 15. The structural frame 1 provides stability to the present invention. Preferably, the structural frame 1 is made of a metal or a metal composite that has the ability to withstand heavy loads that are being used with the present invention. The platform 8, which can be used differently in varying embodiments of the present invention, provides workspace for the user. The use of the platform 8 is determined by the at least one insert 11 which may vary among embodiments. The height-adjustable arm 15 allows the user to adjust the platform 8 to a preferred height. The plurality of wheels 14 provides mobility to the present invention.

As discussed before, the structural frame 1 provides stability to the present invention. To absorb heavy impacts, the structural frame 1 is preferably spring loaded. The shape and size of the structural frame 1 can vary from one embodiment to another. In the preferred embodiment of the present invention, the structural frame 1 has a cubical shape.

Figure 2:
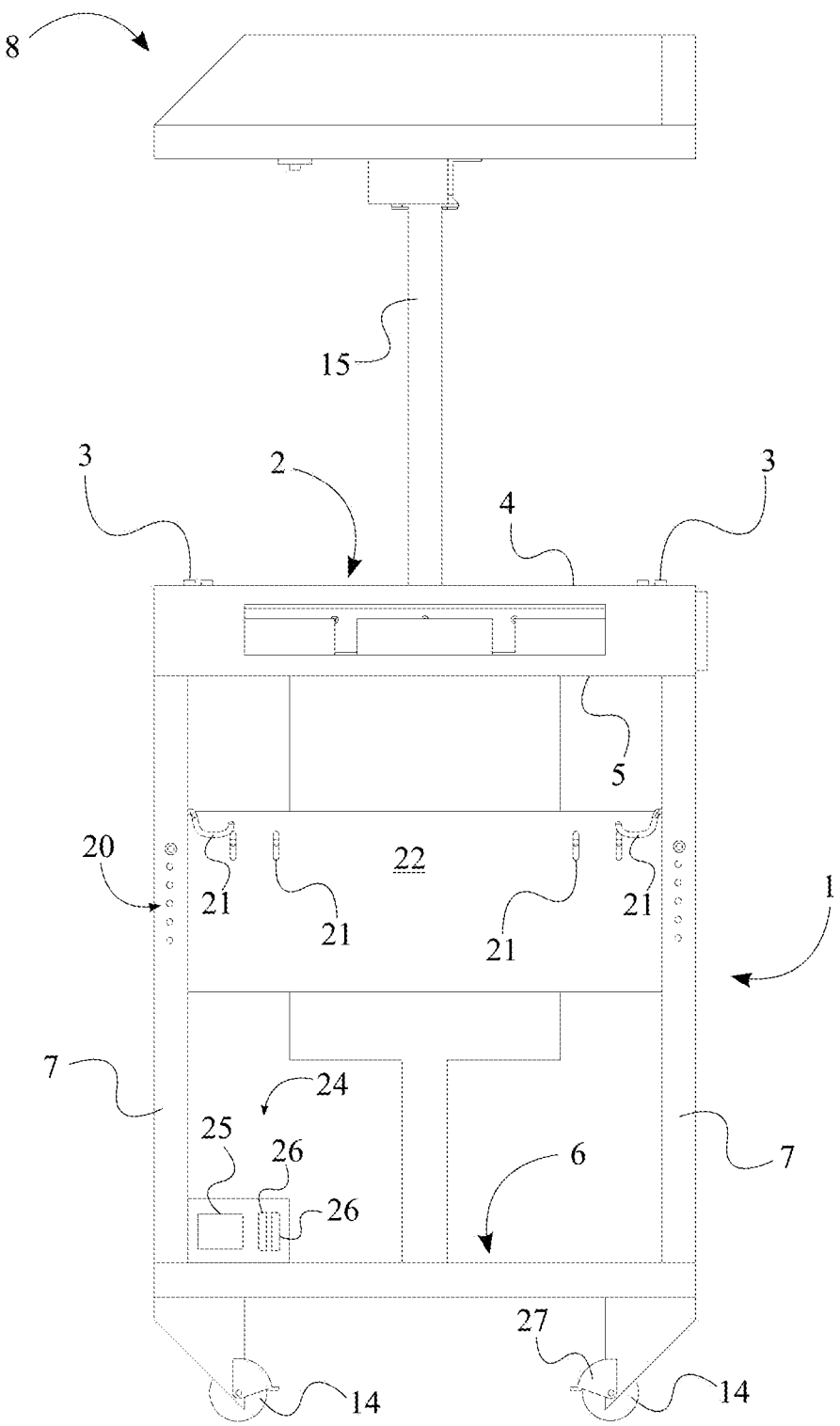
FIG. 2 is a side view of the present invention.

The structural frame 1 comprises a first panel 2, a second panel 6, and a plurality of legs 7. The first panel 2 and the second panel 6, which are parallel to each other, are connected to each other by the plurality of legs 7. In other words, the first panel 2 is terminally connected to the plurality of legs 7 so that the overall shape of the structural frame 1 is cubical. To be connected to the first panel 2, the second panel 6 is terminally connected to the plurality of legs 7 opposite the first panel 2 as seen in FIG. 2.

Figure 13:
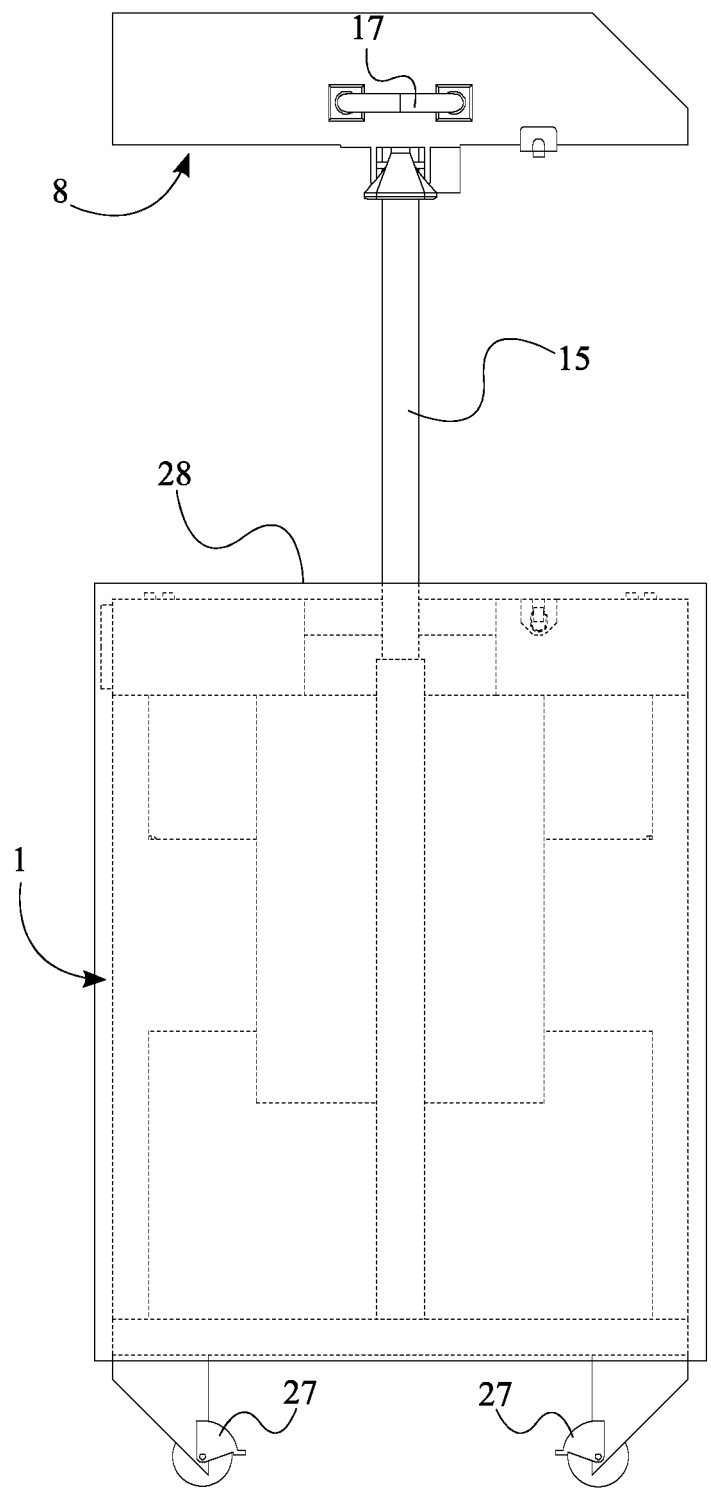
FIG. 13 is a side view of the present invention, wherein a removable frame cover is positioned over the structural frame.

The user can adjust the workspace via the height-adjustable arm 15 which is perpendicularly connected to the structural frame 1 and extends outwards from the structural frame 1. The platform 8, which provides workspace for the user, is terminally connected to the height-adjustable arm 15 opposite to the structural frame 1. Therefore, the platform 8 can be positioned at different heights by controlling the height-adjustable arm 15. To conveniently move the platform 8 to a preferred position, the present invention further comprises a handle 17 which is externally connected to the platform 8 as shown in FIG. 13.

Figure 4:
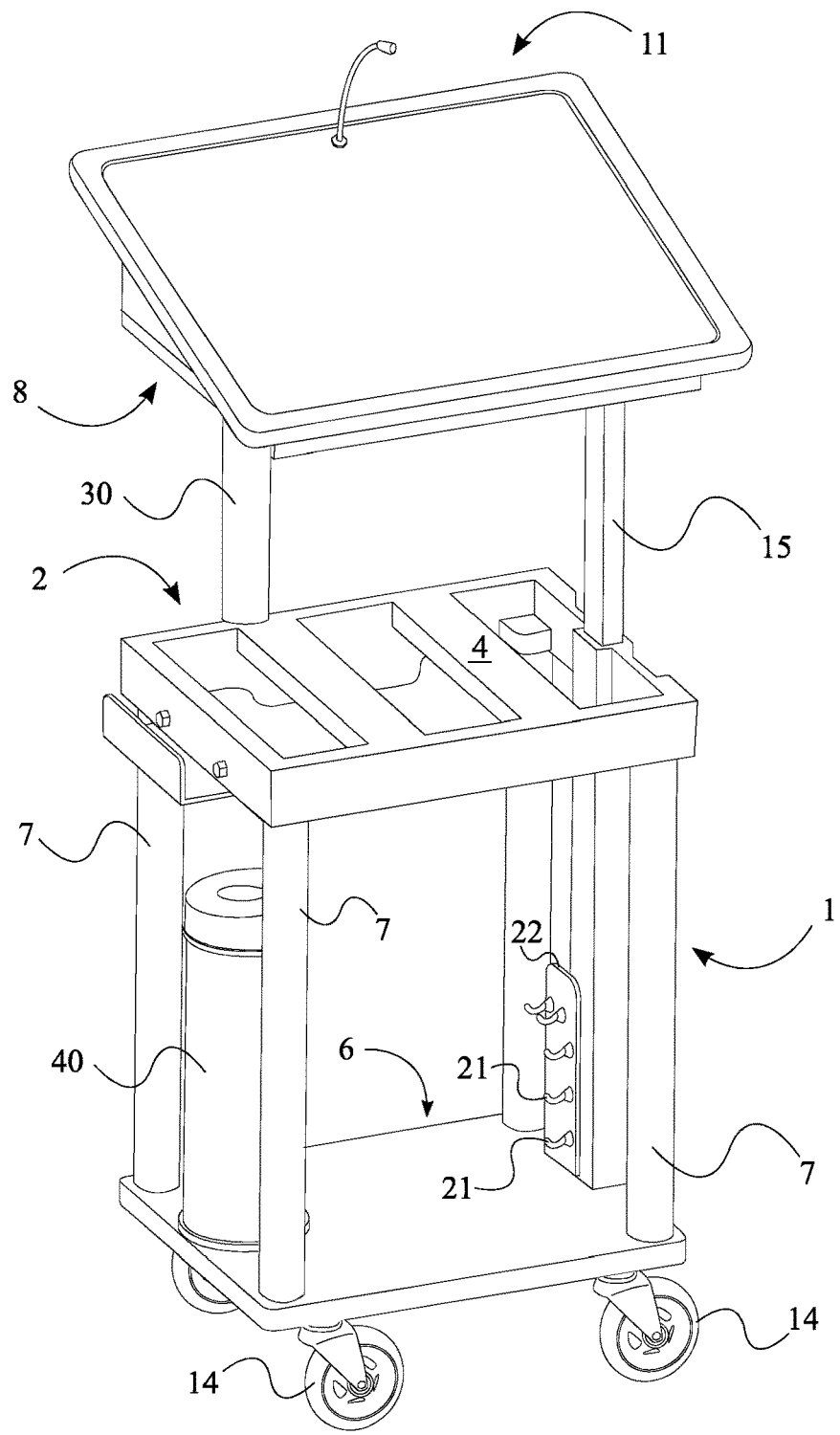
FIG. 4 is a perspective view of the present invention, wherein the at least one insert is a podium insert.
Figure 5:
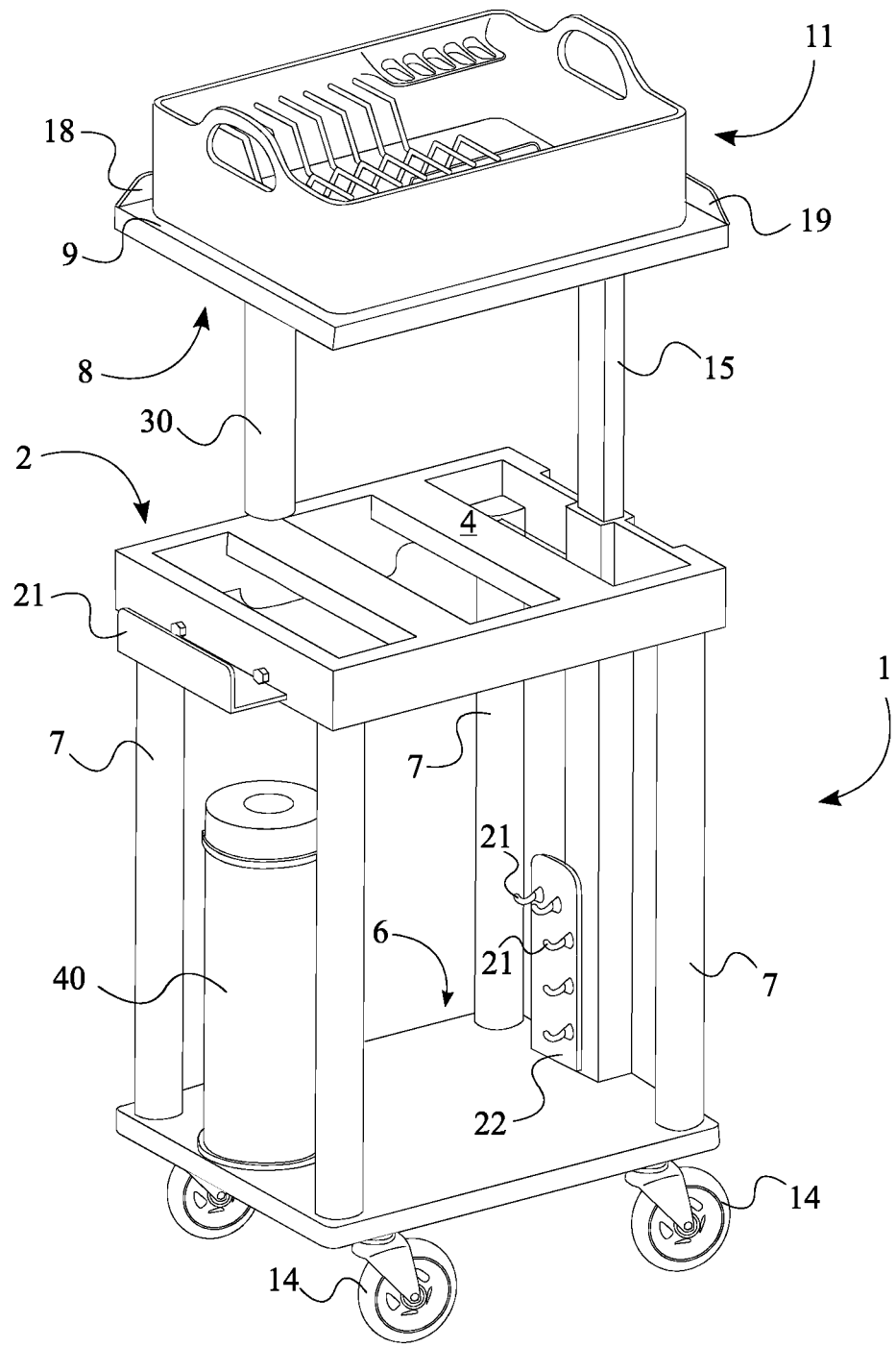
FIG. 5 is a perspective view of the present invention, wherein the at least one insert is a dish drying rack.
Figure 6:
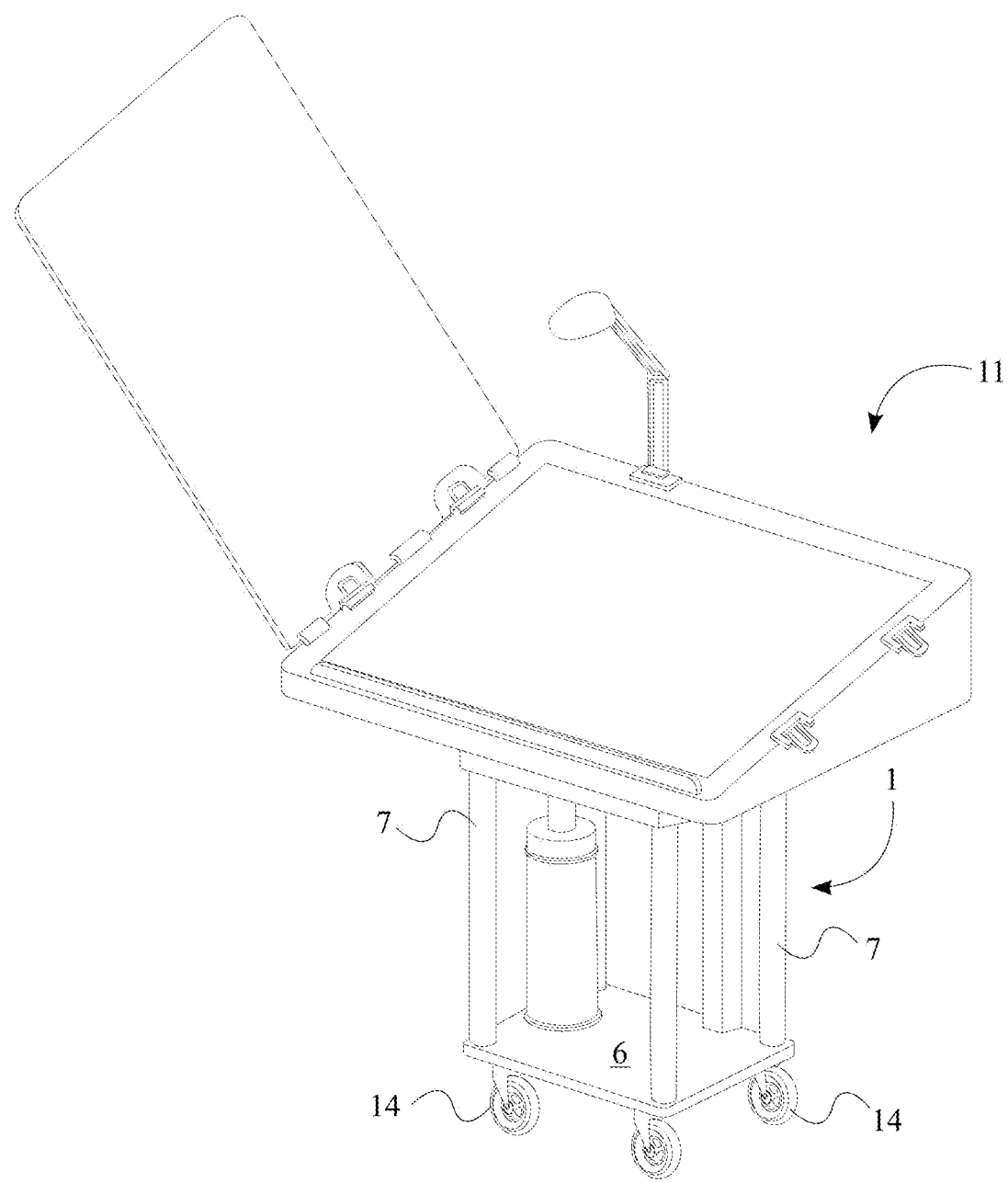
FIG. 6 is a perspective view of the present invention, wherein the at least one insert is a drafting table.
Figure 7:
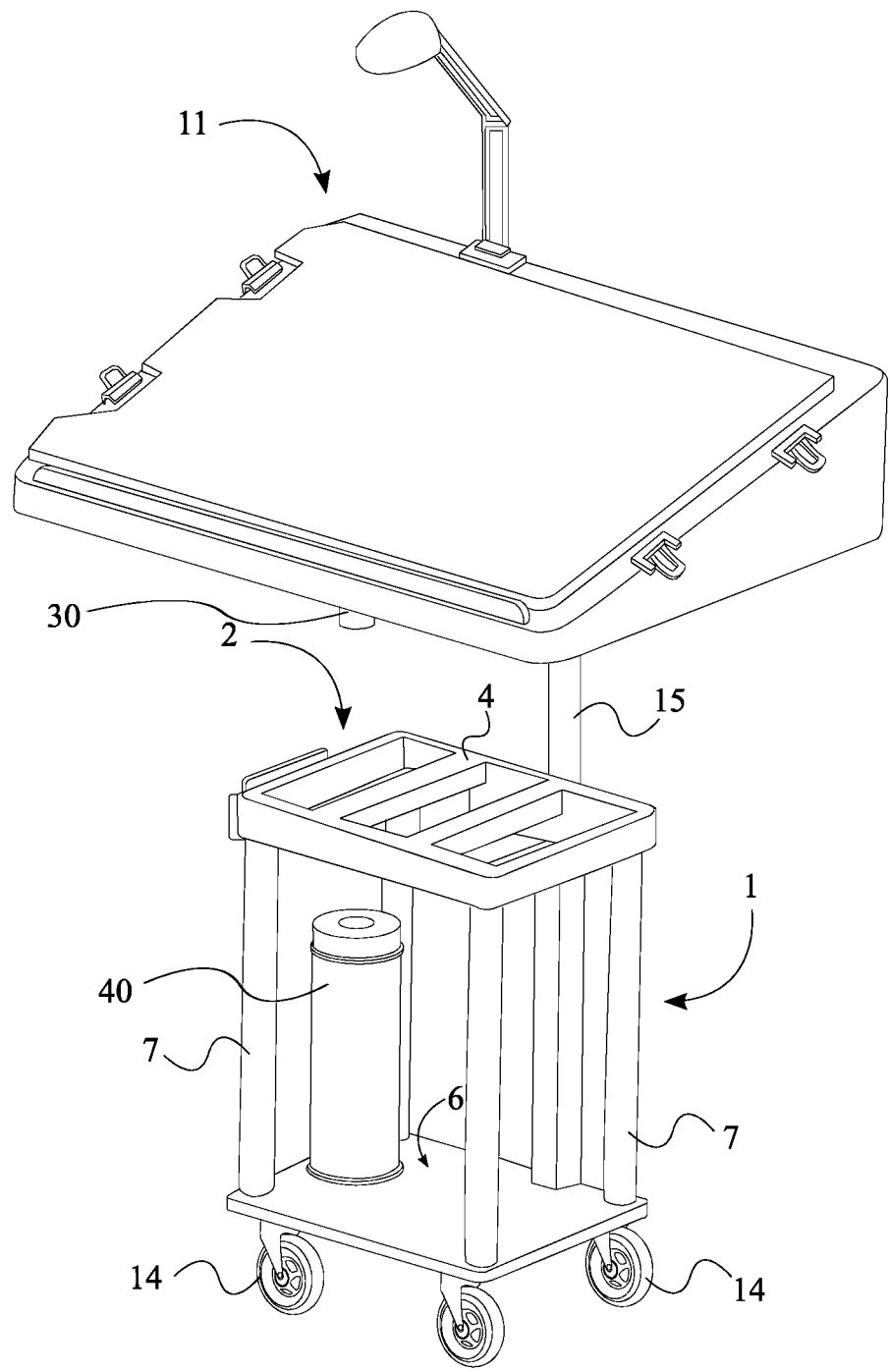
FIG. 7 is a perspective view of the present invention, wherein the at least one insert is a drafting table and the height-adjustable arm is extended.
Figure 8:
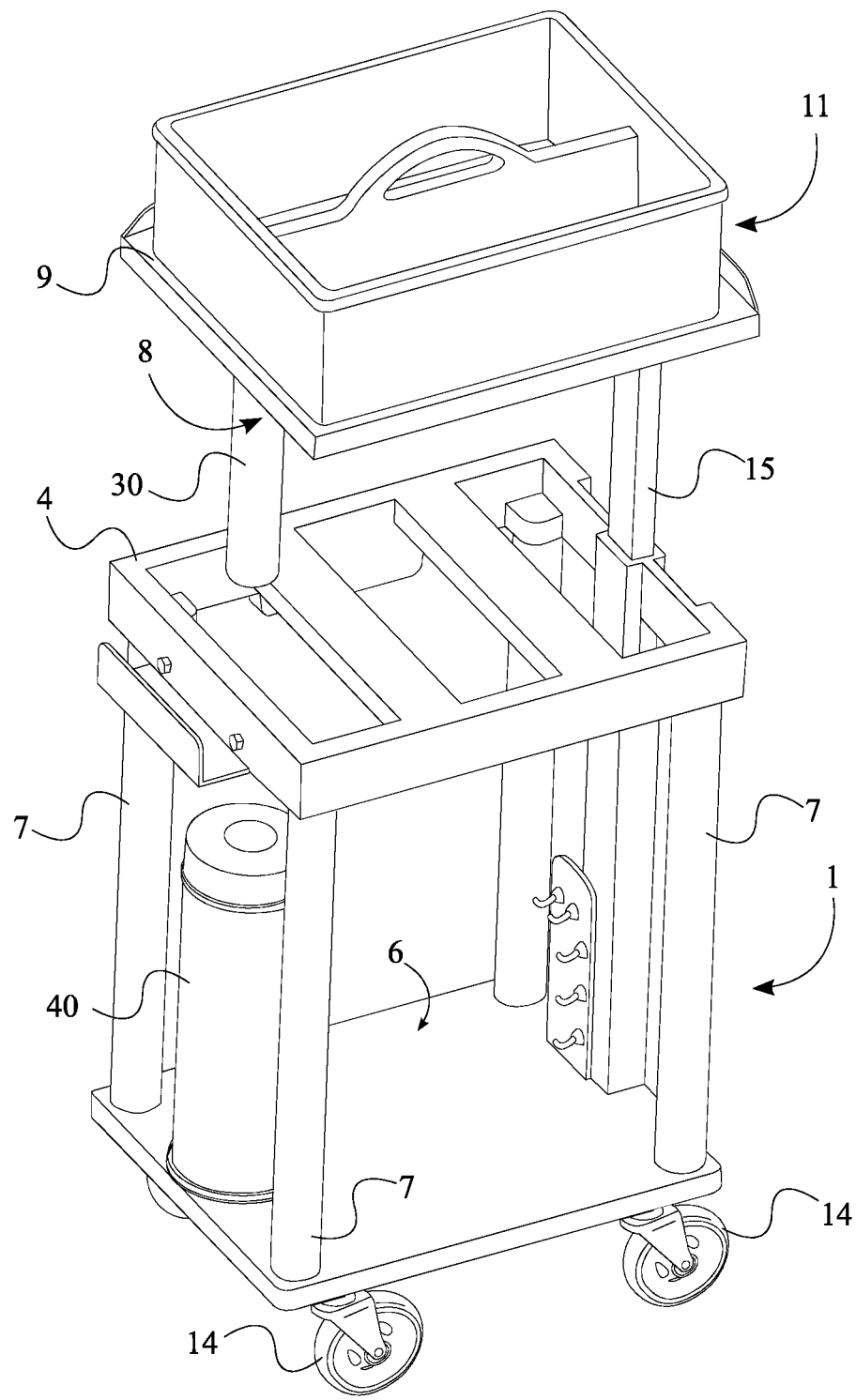
FIG. 8 is a perspective view of the present invention, wherein the at least one insert is a house cleaner rack.
Figure 9:
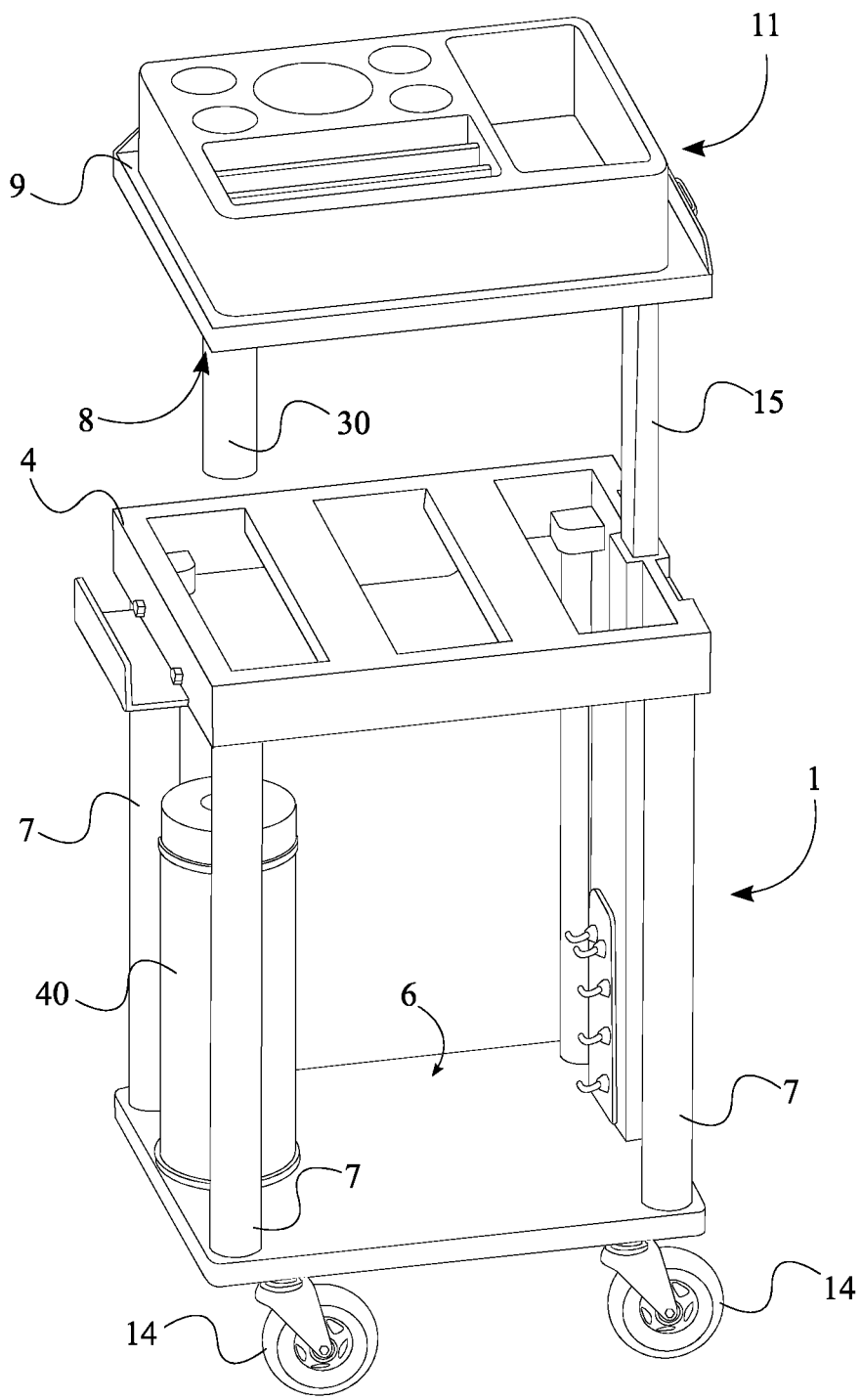
FIG. 9 is a perspective view of the present invention, wherein the at least one insert is a mechanic table insert.
Figure 10:
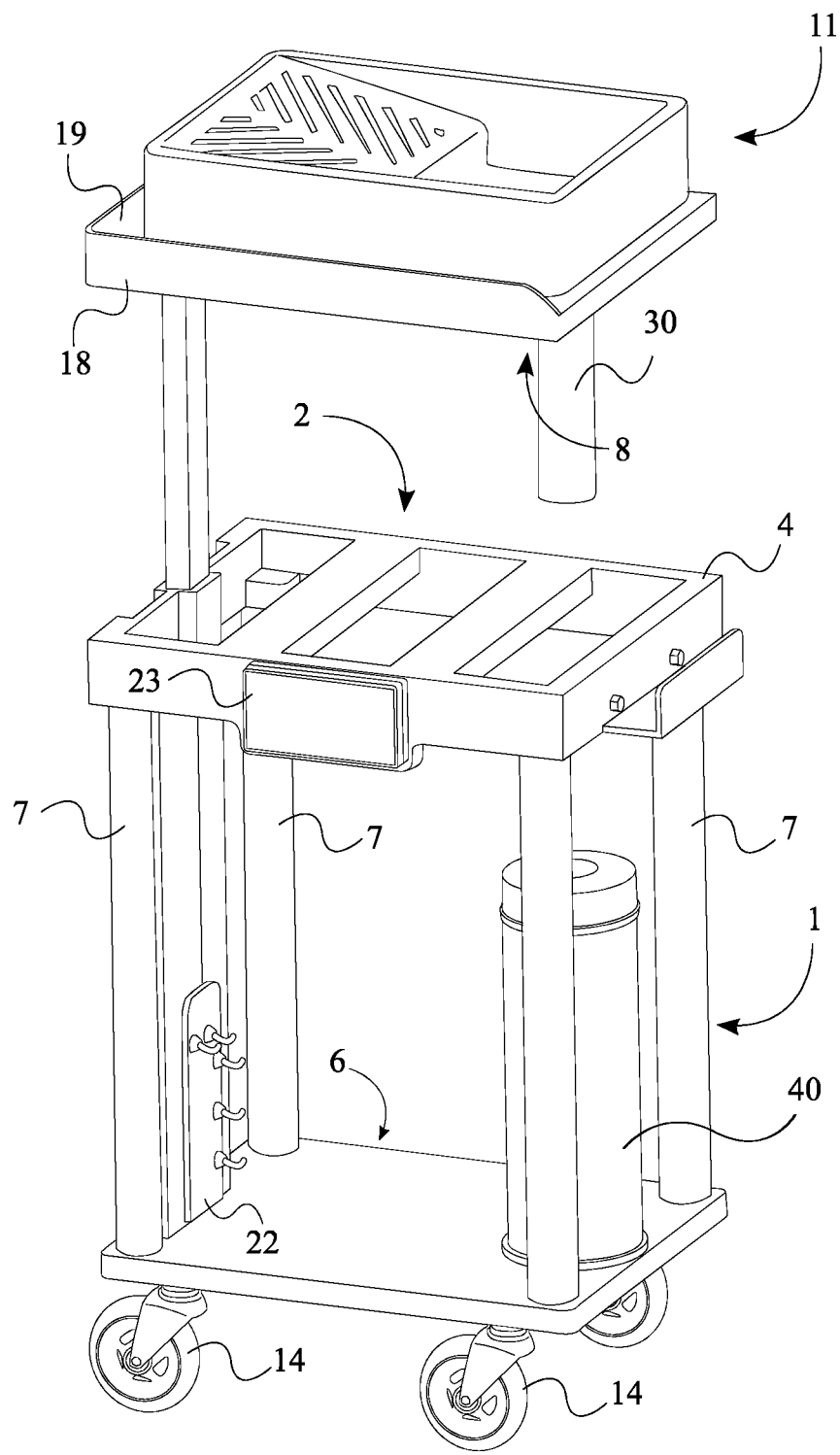
FIG. 10 is a perspective view of the present invention, wherein the at least one insert is a painting table insert.

As seen in FIGS. 4-11, the at least one insert 11 allows the present invention to fulfill the needs of many industries. As an example, in one embodiment of the present invention, the at least one insert 11 can be a podium insert as in FIG. 4. This allows the present invention to be used as a podium. In other embodiments of the present invention, the at least one insert 11 can be, but is not limited to, a drafting table insert as shown in FIG. 6 and FIG. 7; a house cleaner rack insert as seen in FIG. 8; a mechanic table insert as shown in FIG. 9, a painting table insert as shown in FIG. 10, or a cutting table insert, a dish washing rack insert as shown in FIG. 5. To conveniently alternate from one embodiment to another, the at least one insert 11 is removably attached to the platform 8 opposite to the height-adjustable arm 15.

Figure 3:
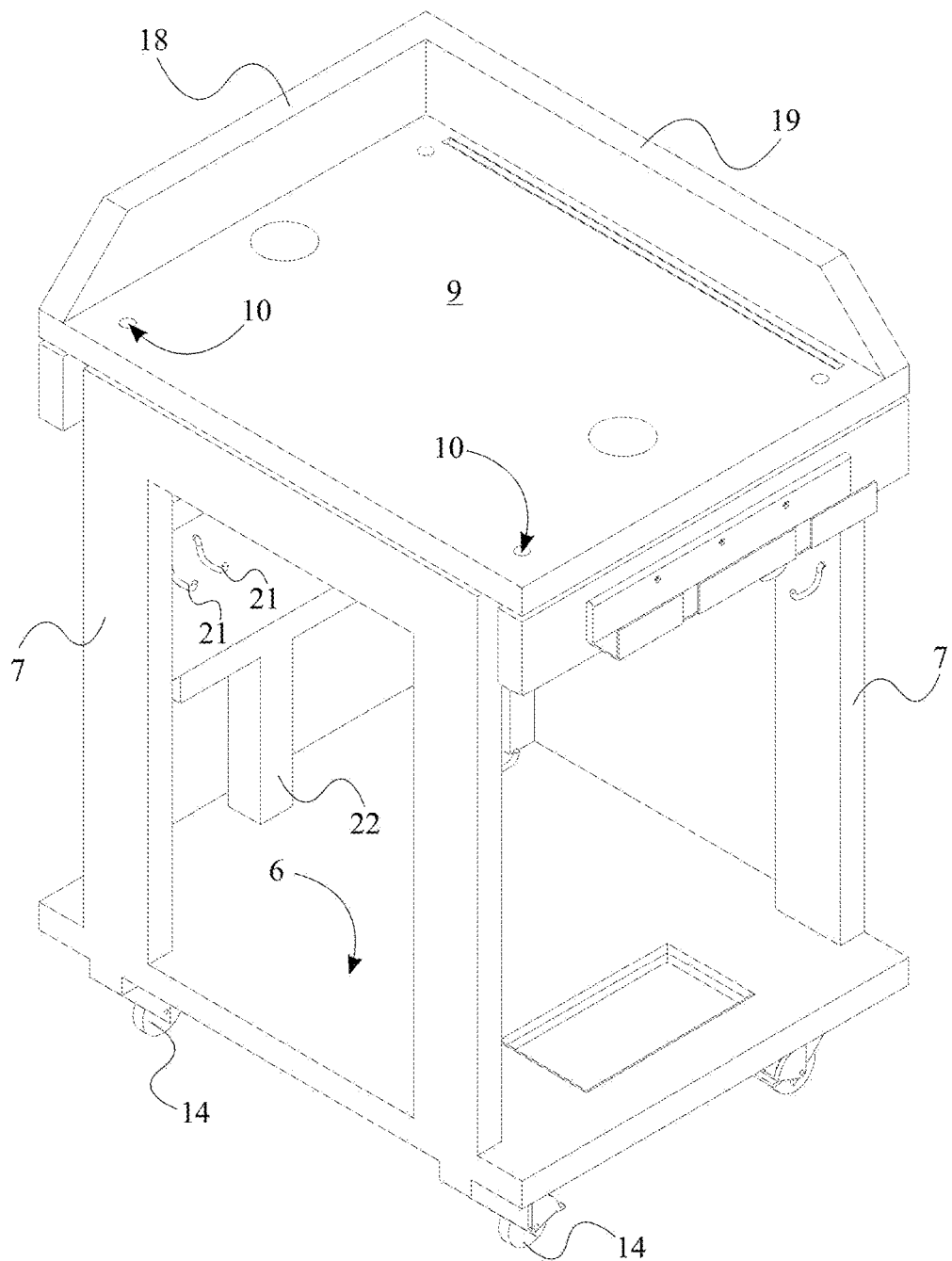
FIG. 3 is a perspective view of the present invention, wherein the platform is in a collapsed configuration.
Figure 12:
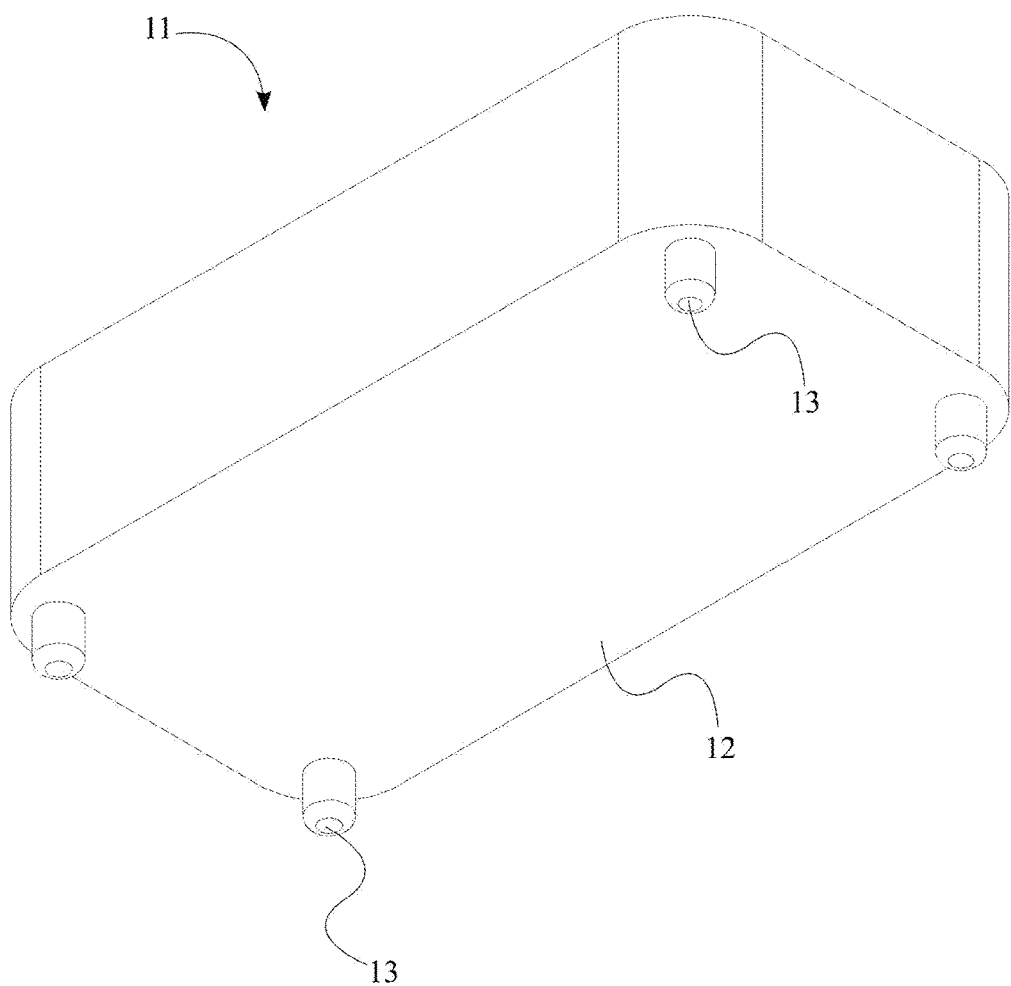
FIG. 12 is a bottom perspective view of the at least one insert, wherein the plurality of protrusions is illustrated.

The at least one insert 11 can be attached to the platform 8 differently in various embodiments of the present invention. As shown in FIG. 12, the at least one insert 11 comprises a base surface 12 and a plurality of protrusions 13 that extend outwards from the base surface 12. As shown in FIG. 3, to be attached to the at least one insert 11, the platform 8 comprises a connecting surface 9 and a plurality of receiving holes 10 that traverse into the connecting surface 9. When appropriately aligned, the plurality of protrusions 13 is removably positioned into the plurality of receiving holes 10.

As illustrated in FIG. 3, to further secure the at least one insert 11, the present invention further comprises a first retainer wall 18 and a second retainer wall 19 that prevents the at least one insert 11 from sliding off the platform 8. In doing so, the first retainer wall 18 and the second retainer wall 19 are perpendicularly connected along an outer perimeter of the platform 8. For the at least one insert 11 to be pushed against the first retainer wall 18 and the second retainer wall 19, the first retainer wall 18 is terminally and perpendicularly connected to the second retainer wall 19.

When the platform 8 is at a preferred height, the present invention can utilize a locking mechanism to secure the platform 8 at the preferred height. To do so, the locking mechanism is integrated into the height-adjustable arm 15 in between the structural frame 1 and the platform 8. The locking mechanism can vary in different embodiments of the present invention.

Figure 14:
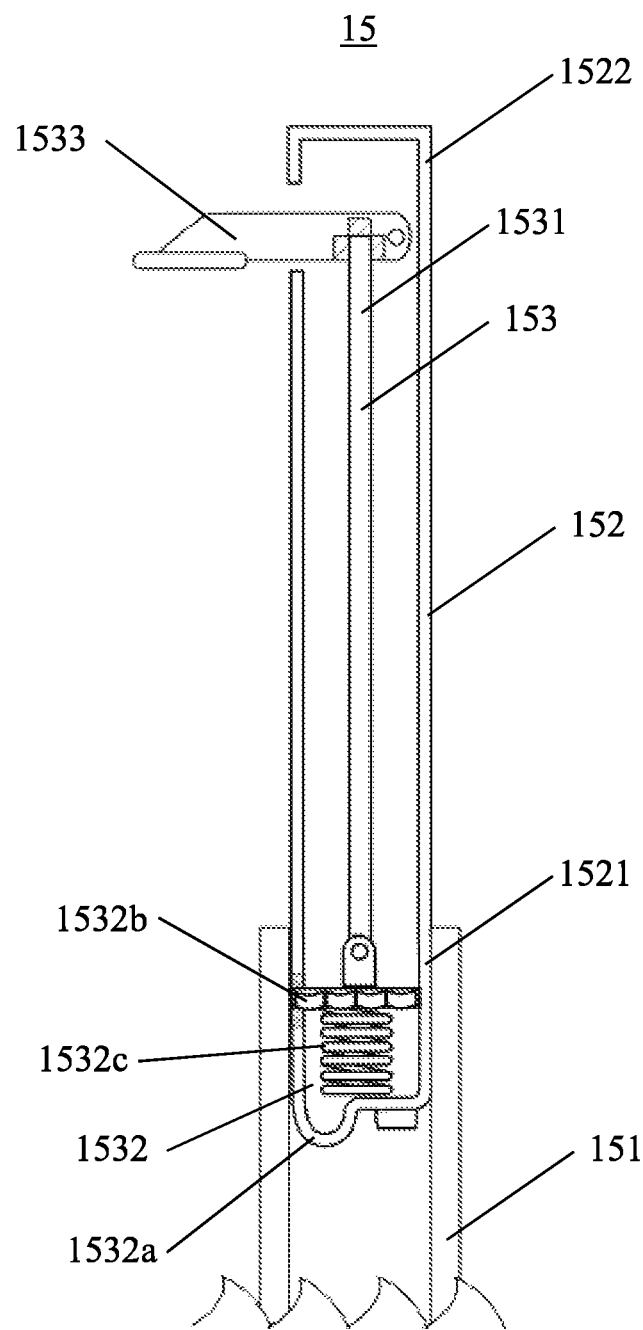
FIG. 14 is a side view of the height-adjustable arm of the present invention, wherein a braking member is driven by a spring to be engaged with a guide.
Figure 15:
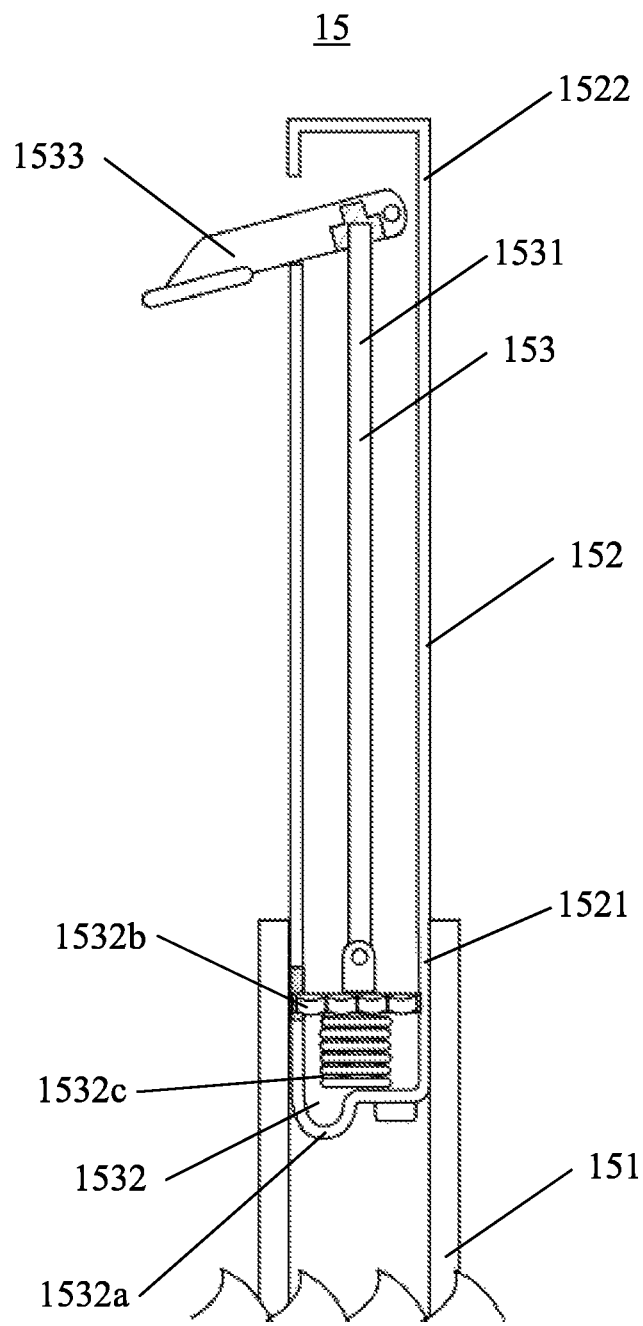
FIG. 15 is a side view of the height-adjustable arm of the present invention, wherein the braking member is driven by a rod to be disengaged with the guide.

Specifically, the height-adjustable arm 15 comprises a guide 151, a bar 152 and the locking mechanism 153, as seen in FIGS. 14-15. The guide 151 extends vertically upward from the structural frame 1. The bar 152 comprises a first end 1521 and a second end 1522 oppositely located to each other. The first end 1521 of the bar 152 is slidably inserted into the guide 151. The platform 8 is terminally connected with the second end 1522 of the bar 152. The locking mechanism 153 comprises a rod 1531, a braking device 1532 and a lever 1533. The rod 1531 traverses through and extends along the bar 152. The braking device 1532 comprises a body 1532a, a braking member 1532b and a spring 1532c. The body 1532a is connected with the first end 1521 of the bar 152. The braking member 1532b is rotatably connected with the body 1532a and contacts against the rod 1531. The spring 1532c is biased in between the body 1532a and the braking member 1532b. The lever 1533 is rotatably connected with the second end 1522 of the bar 152 and contacts against the rod 1531. The braking member 1532b is driven by the rod 1531 to be disengaged with the guide 151 when the lever 1533 is pushed downward to render the rod 1533 moving towards the braking member 1532b. The braking member 1532b is driven by the spring 1532c to be engaged with the guide 151 when the lever 1533 is released to render the rod 1531 moving away from the braking member 1532b.

At the lowest available height, the platform 8 is in contact with the first panel 2. Therefore, when a load is applied at the platform 8, a considerable force is transferred to the structural frame 1. To minimize the force transferred onto the structural frame 1, the first panel 2 comprises a plurality of stoppers 3, a top surface 4, and a bottom surface 5. The bottom surface 5 is connected to the plurality of legs 7 as seen in FIG. 2. The top surface 4 is positioned opposite the bottom surface 5 and across the first panel 2. As seen in FIG. 1 and FIG. 2, the plurality of stoppers 3 is distributed along the top surface 4 so that the platform 8 does not make direct contact with the top surface 4.

In addition to adjusting the height of the platform 8, the plurality of legs 7 can also be height adjustable. The height adjustability of the plurality of legs 7 is beneficial when a considerable height needs to be reached while maintaining the balance of the structural frame 1. Therefore, in another embodiment of the present invention, a height-adjusting mechanism 20 can be integrated into the plurality of legs 7 in between the first panel 2 and the second panel 6 as illustrated in FIG. 2.

Figure 11:
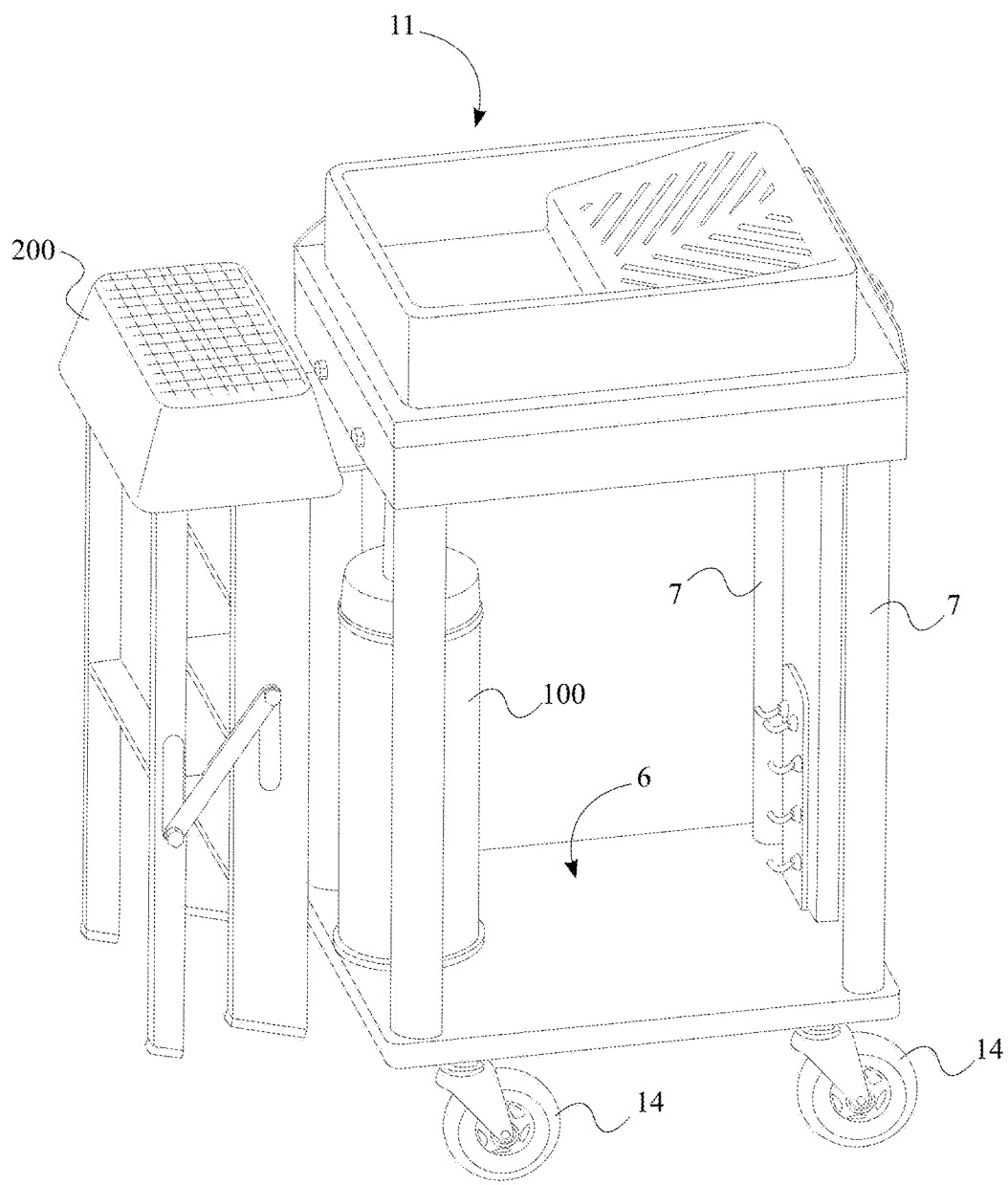
FIG. 11 is a perspective view of the present invention, wherein a ladder is attached to one of the plurality of attachment points.

The platform 8, the first panel 2, and the second panel 6 can all be used for holding items. As an example, if the present invention is being used in a supermarket, the platform 8 and the second panel 6 can be used for placing boxes or similar items. Occasionally, when the platform 8 is raised to a considerable height, the first panel 2 can also be used for placing items. For additional storing purposes, the present invention further comprises a plurality of attachment points 21 that are mounted onto the plurality of legs 7 as shown in FIG. 2. The present invention further comprises a plurality of intermediary sections 22 that provide additional storage area for the user. As seen in FIGS. 3-5, the plurality of intermediary sections 22 will be mounted to the structural frame 1 in between each of the plurality of legs 7. To use the additional surface area, the plurality of attachment points 21 is mounted to the plurality of intermediary sections 22. The items held by the plurality of attachment points 21 vary from one embodiment to another. As an example, if the present invention is being used in cleaning, the plurality of attachment points 21 can be used to hold cleaning equipment such as a spray bottle, a duster, or a trash can 100, as illustrated in FIG. 11. In another embodiment, if the present invention is being used in a supermarket, one of the plurality of attachment points 21 can be used to hold a ladder 200.

The present invention can also be attached to other carts or comparable equipment. As seen in FIG. 10, the present invention further comprises a magnetic attachment unit 23 which is being externally connected to the structural frame 1. When needed, a steel cart or other comparable equipment is placed adjacent to the magnetic attachment so that the steel cart is attached to the present invention.

In reference to FIG. 2, the present invention further comprises a portable power station 24 that can be used for powering an electronic device. The portable power station 24 comprises a rechargeable battery 25 and a plurality of input/output ports 26 that are electrically connected to the rechargeable battery 25. The plurality of input/output ports 26 allows the user to draw out electricity from the rechargeable battery 25. Preferably, the portable power station 24 will be mounted onto the second panel 6.

As discussed earlier, the plurality of wheels 14 provides mobility to the present invention. To do so, the plurality of wheels 14 is connected to the structural frame 1 adjacent to the second panel 6 and opposite to the plurality of legs 7. The number of wheels used in the present invention can vary from one embodiment to another. In the preferred embodiment of the present invention, four wheels are being utilized. However, if the present invention has a considerably large structural frame 1 in another embodiment of the present invention, more wheels can be used as the plurality of wheels 14. For the present invention to be stationed at a preferred location, each of the plurality of wheels 14 comprises a wheel-locking mechanism 27 as illustrated in FIG. 13. For added user convenience, each of the plurality of wheels 14 is be a 360-degree swivel wheel.

As further illustrated in FIG. 13, to obtain aesthetically pleasing appearances and protect items held within the structural frame 1, the present invention further comprises a removable frame cover 28. The removable frame cover 28 is removably positioned over the structural frame 1 so that the structural frame 1 is concealed by the removable frame cover 28. Preferably, the removable frame cover 28 is manufactured from a printable material so that the user can print a preferred logo on the removable frame cover 28. As an example, if the at least one insert 11 is a podium insert, the removable frame cover 28 can be used to showcase a logo. In addition to providing aesthetically pleasing appearances, the removable frame cover 28 also protects the structural frame 1 from being damaged.

The process of utilizing the present invention can vary from one embodiment to another. However, when the present invention is used in a supermarket for stacking items or cleaning, the following process flow is generally followed. The items that need to be stacked are initially placed on the platform 8. Additional items that need to be stacked are placed on the second panel 6. If required, other necessary items such as a ladder or spray bottle are attached to attachment points from the plurality of attachment points 21. Upon placing the items, the present invention is moved to the preferred location by using the plurality of wheels 14. At the preferred location, the platform 8 is raised to a preferred height with the use of the height-adjustable arm 15. If needed, the ladder, the spray bottle or other comparable item attached to an attachment point from the plurality of attachment points 21 is detached.

When the present invention is being used as a podium, the podium insert is removably attached to the platform 8. When appropriately attached, the podium insert is pressed against the first retainer wall 18 and the second retainer wall 19. If an electronic equipment needs electrical power, the portable power station 24 is used. More specifically, electricity is drawn from the rechargeable battery 25 via the plurality of input/output ports 26 to power the electronic equipment that can be, but is not limited to, a reading lamp, a personal computer or other comparable item.

The present invention further comprises a chute 30 and a container 40, as seen in FIGS. 4-5, 7 and 8-10. The chute 30 is connected with the platform 8 and penetrates the platform 8. The container 40 is disposed on the second panel 6 and corresponding to the chute 30.

Although the invention has been explained in relation to its preferred embodiment, it is to be understood that many other possible modifications and variations can be made without departing from the spirit and scope of the invention as hereinafter claimed.

What is claimed is:

1. A multipurpose mobile utility lifting ergonomic cart comprising:
    a structural frame;
    a platform;
    at least one insert;
    a plurality of wheels;
    a height-adjustable arm;
    a chute;
    a container;
    the structural frame comprising a first panel, a second panel and a plurality of legs;
    the first panel being terminally connected to the plurality of legs;
    the second panel being terminally connected to the plurality of legs opposite to the first panel;
    the height-adjustable arm being perpendicularly connected to the structural frame;
    the platform being terminally connected to the height-adjustable arm opposite to the structural frame;
    the at least one insert being removably attached to the platform opposite to the height-adjustable arm;
    the plurality of wheels being connected to the structural frame adjacent to the second panel and opposite to the plurality of legs;
    the height-adjustable arm comprising a guide, a bar and a locking mechanism;
    the guide extending vertically upward from the structural frame;
    the bar comprising a first end and a second end oppositely located to each other;
    the first end of the bar being slidably inserted into the guide;
    the platform being terminally connected with the second end of the bar;
    the locking mechanism comprising a rod, a braking device and a lever;
    the rod traversing through and extending along the bar;
    the braking device comprising a body, a braking member and a spring;
    the body being connected with the first end of the bar;
    the braking member being rotatably connected with the body and contacting against the rod;
    the spring being biased in between the body and the braking member;
    the lever being rotatably connected with the second end of the bar and contacting against the rod;
    the braking member being driven by the rod to be disengaged with the guide in response to the lever being pushed downward to render the rod moving towards the braking member;

the braking member being driven by the spring to be engaged with the guide in response to the lever being released to render the rod moving away from the braking member;

the first panel comprising a plurality of stoppers, a top surface and a bottom surface;

the bottom surface being connected to the plurality of legs;

the top surface being positioned opposite the bottom surface and across the first panel;

the plurality of stoppers being distributed along the top surface;

the platform being selectively adjusted in between a lowest height position and a highest height position with respect to the first panel via the height-adjustable arm;

the plurality of stoppers contacting against the platform so as to prevent the platform from directly contacting against the top surface in response to the platform being in the lowest height position;

the chute being connected with the platform and penetrating the platform; and the container being disposed on the second panel and corresponding to the chute.

2. The multipurpose mobile utility lifting ergonomic cart as claimed in claim 1 comprising:

the at least one insert comprising a base surface and a plurality of protrusions;

the platform comprising a connecting surface and a plurality of receiving holes;

the plurality of protrusions extending outwards from the base surface;

the plurality of receiving holes traversing into the connecting surface;

the plurality of receiving holes being distributed along the connecting surface; and the plurality of protrusions being removably positioned into the plurality of receiving holes.

3. The multipurpose mobile utility lifting ergonomic cart as claimed in claim 1 comprising:

a handle; and the handle being externally connected to the platform.

4. The multipurpose mobile utility lifting ergonomic cart as claimed in claim 1 comprising:

a first retainer wall;

a second retainer wall;

the first retainer wall and the second retainer wall being perpendicularly connected along an outer perimeter of the platform; and the first retainer wall being terminally and perpendicularly connected to the second retainer wall.

5. The multipurpose mobile utility lifting ergonomic cart as claimed in claim 1, wherein each of the plurality of legs comprising a height-adjustment mechanism.

6. The multipurpose mobile utility lifting ergonomic cart as claimed in claim 1 comprising:

a plurality of attachment points; and the plurality of attachment points being mounted onto the structural frame.

7. The multipurpose mobile utility lifting ergonomic cart as claimed in claim 6 comprising:

the structural frame comprising an intermediary section;

the intermediary sections intermediary section being mounted in between two adjacent legs of the plurality of legs; and the plurality of attachment points being mounted to the intermediary section.

8. The multipurpose mobile utility lifting ergonomic cart as claimed in claim 1 comprising:

a magnetic attachment unit; and the magnetic attachment unit being externally connected to the structural frame.

9. The multipurpose mobile utility lifting ergonomic cart as claimed in claim 1 comprising:

a portable power station;

the portable power station comprising a rechargeable battery and a plurality of input/output ports;

the portable power station being mounted onto the second panel; and the plurality of input/output ports being electrically connected to the rechargeable battery.

10. The multipurpose mobile utility lifting ergonomic cart as claimed in claim 1, wherein each of the plurality of wheels comprising a wheel-locking mechanism.

11. The multipurpose mobile utility lifting ergonomic cart as claimed in claim 1 comprising:

a removable frame cover; and the removable frame cover being removably positioned over the structural frame.

12. The multipurpose mobile utility lifting ergonomic cart as claimed in claim 1, wherein the at least one insert is a podium insert.

13. The multipurpose mobile utility lifting ergonomic cart as claimed in claim 1, wherein the at least one insert is a drafting table.

14. The multipurpose mobile utility lifting ergonomic cart as claimed in claim 1, wherein the at least one insert is a house cleaner rack.

15. The multipurpose mobile utility lifting ergonomic cart as claimed in claim 1, wherein the at least one insert is a cutting table insert.

* * * * *